United States Patent
Jayaraman et al.

(10) Patent No.: US 6,968,001 B2
(45) Date of Patent: Nov. 22, 2005

(54) COMMUNICATION RECEIVER WITH VIRTUAL PARALLEL EQUALIZERS

(75) Inventors: Srikant Jayaraman, San Diego, CA (US); Ivan Jesus Fernandez Corbaton, San Diego, CA (US); John E. Smee, San Diego, CA (US); Michael A. Howard, Cardiff, CA (US)

(73) Assignee: Qualcomm Incorporated, San Diego, CA (US)

( * ) Notice: Subject to any disclaimer, the term of this patent is extended or adjusted under 35 U.S.C. 154(b) by 130 days.

(21) Appl. No.: 10/226,031

(22) Filed: Aug. 21, 2002

(65) Prior Publication Data

US 2004/0037354 A1 Feb. 26, 2004

(51) Int. Cl.[7] .............................. H03H 7/30; H03H 7/40; H03K 5/159
(52) U.S. Cl. ....................................................... 375/231
(58) Field of Search ................................ 708/319–323; 375/259, 285, 316, 350, 229, 230, 231, 232, 233, 234

(56) References Cited

U.S. PATENT DOCUMENTS

| | | | |
|---|---|---|---|
| 5,268,930 A | * | 12/1993 | Sendyk et al. ............... 375/231 |
| 5,666,378 A | * | 9/1997 | Marchetto et al. ........... 375/222 |
| 5,787,118 A | | 7/1998 | Ueda |
| 5,787,133 A | * | 7/1998 | Marchetto et al. ........... 375/366 |
| 6,016,379 A | | 1/2000 | Bulow |
| 6,735,244 B1 | * | 5/2004 | Hasegawa et al. ........... 375/219 |
| 2002/0196844 A1 | * | 12/2002 | Rafie et al. .................. 375/232 |

FOREIGN PATENT DOCUMENTS

EP 0782305 2/1997

* cited by examiner

*Primary Examiner*—Jean B. Corrielus
(74) *Attorney, Agent, or Firm*—Philip Wadsworth; Sandra L. Godsey

(57) ABSTRACT

Method for optimizing an equalizer at a receiver in a communication system by training virtual parallel equalizers. Multiple configurations are applied for training an equalizer, and a performance measurement or estimate determined. The performance measures of the multiple configurations are compared to determine the optimum configuration. The training and selection are performed at a rate sufficiently higher than the received sample rate as to allow optimization in between processing of data samples.

15 Claims, 15 Drawing Sheets

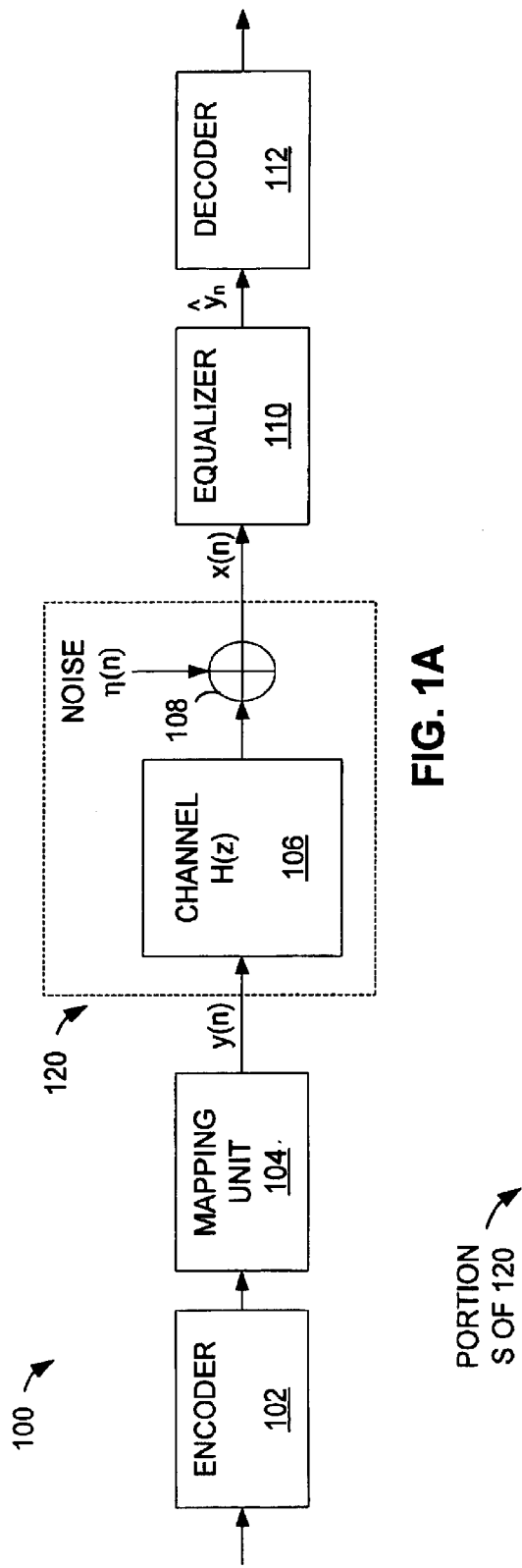
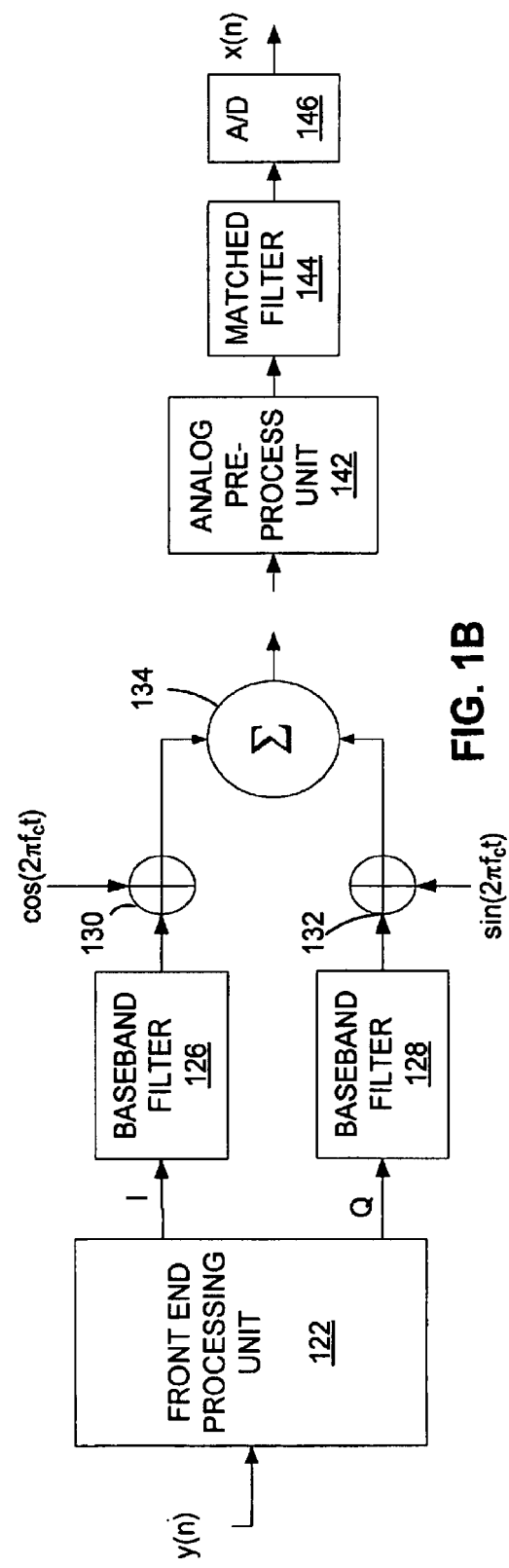

| CONFIGURATION | FIR LENGTH | SECTOR ID |
|---|---|---|
| 1 | L1 | S1 |
| 2 | L1 | S2 |
| 3 | L2 | S1 |
| ... | ... | ... |
| N | L3 | S3 |

FIG. 11

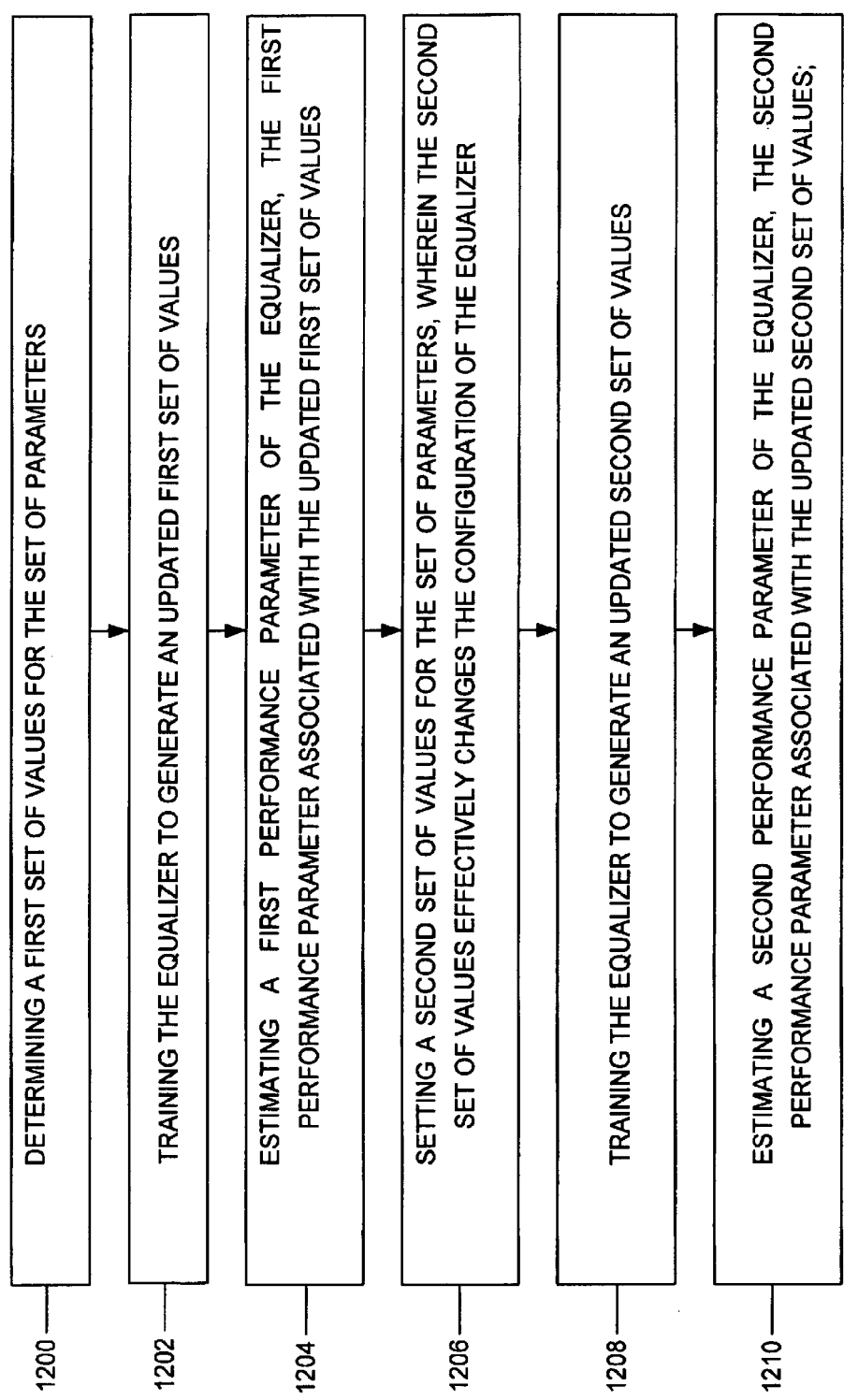

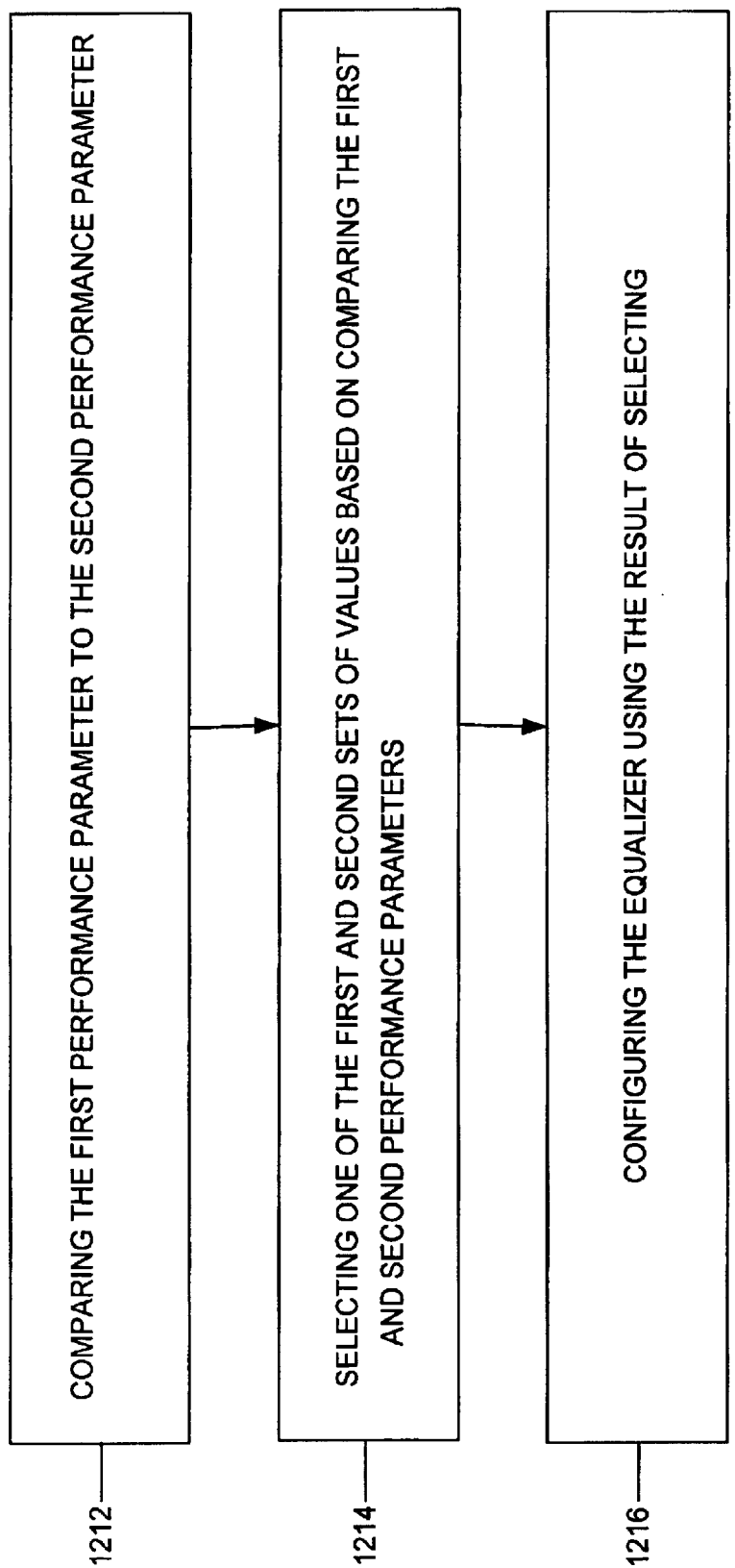

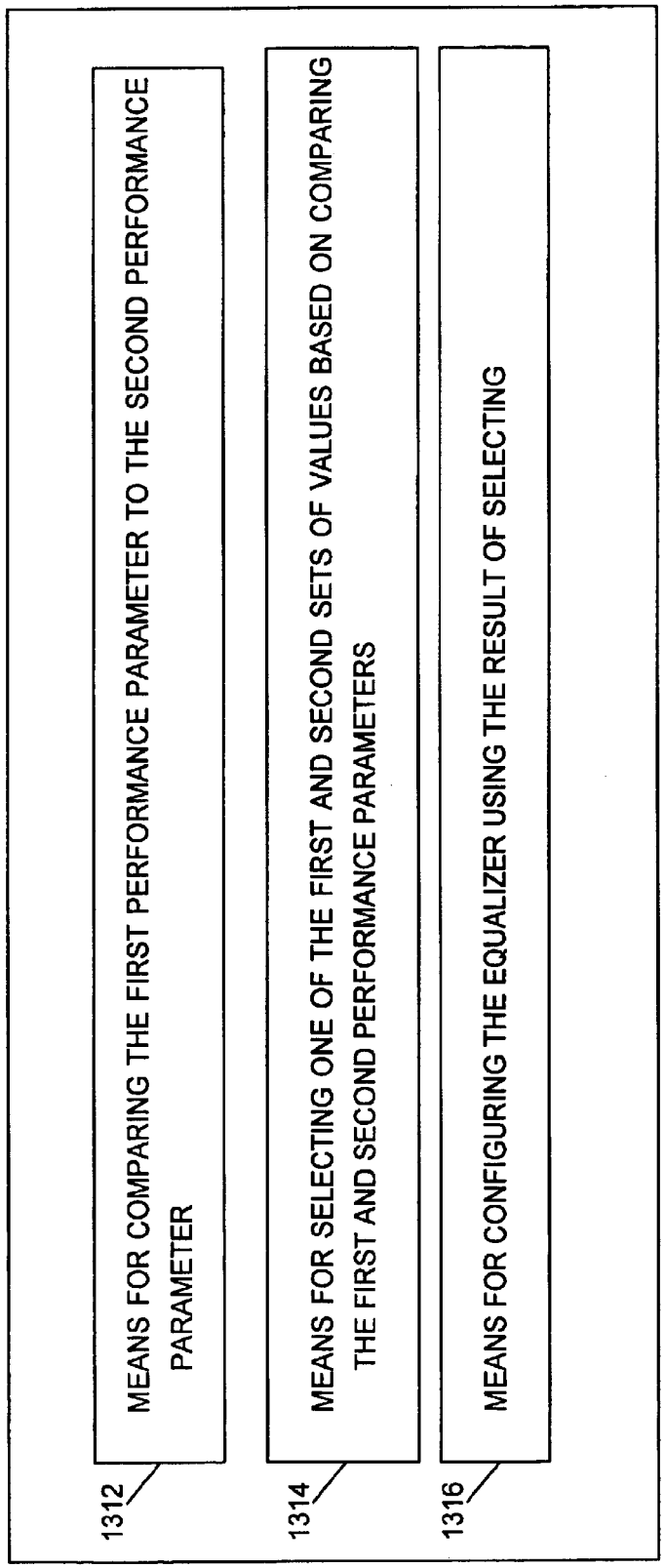
FIG. 13B
(CONTINUED FROM FIG. 13A)

COMMUNICATION RECEIVER WITH VIRTUAL PARALLEL EQUALIZERS

BACKGROUND

1. Field

The present invention relates generally to equalization in communications systems, and more specifically, to a universal receiver incorporating virtual parallel equalizers.

2. Background

Communications systems are used for transmission of information from one device to another. Prior to transmission, information is encoded into a format suitable for transmission over a communication channel. The transmitted signal is distorted as it travels through the communication channel; the signal also experiences degradation from noise and interference picked up during transmission. An example of interference commonly encountered in bandlimited channels is called inter-symbol interference (ISI). ISI occurs as a result of the spreading of a transmitted symbol pulse due to the dispersive nature of the channel, which results in an overlap of adjacent symbol pulses. The received signal is decoded and translated into the original pre-encoded form. Both the transmitter and receiver are designed to minimize the effects of channel imperfections and interference. For the purposes of this disclosure, interference or distortion due to channel imperfections, or any combination thereof will be referred to generally as noise.

Various receiver designs may be implemented to compensate for noise caused by the transmitter and the channel. By way of example, an equalizer is a common choice for dealing with ISI. An equalizer corrects for distortions and generates an estimate of the transmitted symbol. In the wireless environment, equalizers are required to handle time-varying channel conditions. Ideally, the response of the equalizer adjusts to changes in channel characteristics. The ability of the equalizer to respond to changing conditions is related to the number of taps of the equalizer. More taps allow the equalizer to more accurately adjust to changes, while fewer taps allow faster adaptation. Optimizing the equalizer by selecting the number of taps is difficult, as this requires a balancing of competing goals.

A need exists, therefore, for an equalizer design that optimizes performance for a variety of systems and conditions.

BRIEF DESCRIPTION OF THE DRAWINGS

FIG. 1A is a block diagram of components in a communication system;

FIG. 1B is a detailed portion of the communication system as in FIG. 1A;

FIG. 11 illustrates various equalizer configurations;

FIGS. 12A–12B illustrate a method of estimating a transmitted signal from a received sample using an equalizer defined by a set of parameters; and FIGS. 13A–13B illustrate an apparatus for estimating a transmitted signal from a received sample using an equalizer defined by a set of parameters.

DETAILED DESCRIPTION

Figure 2:
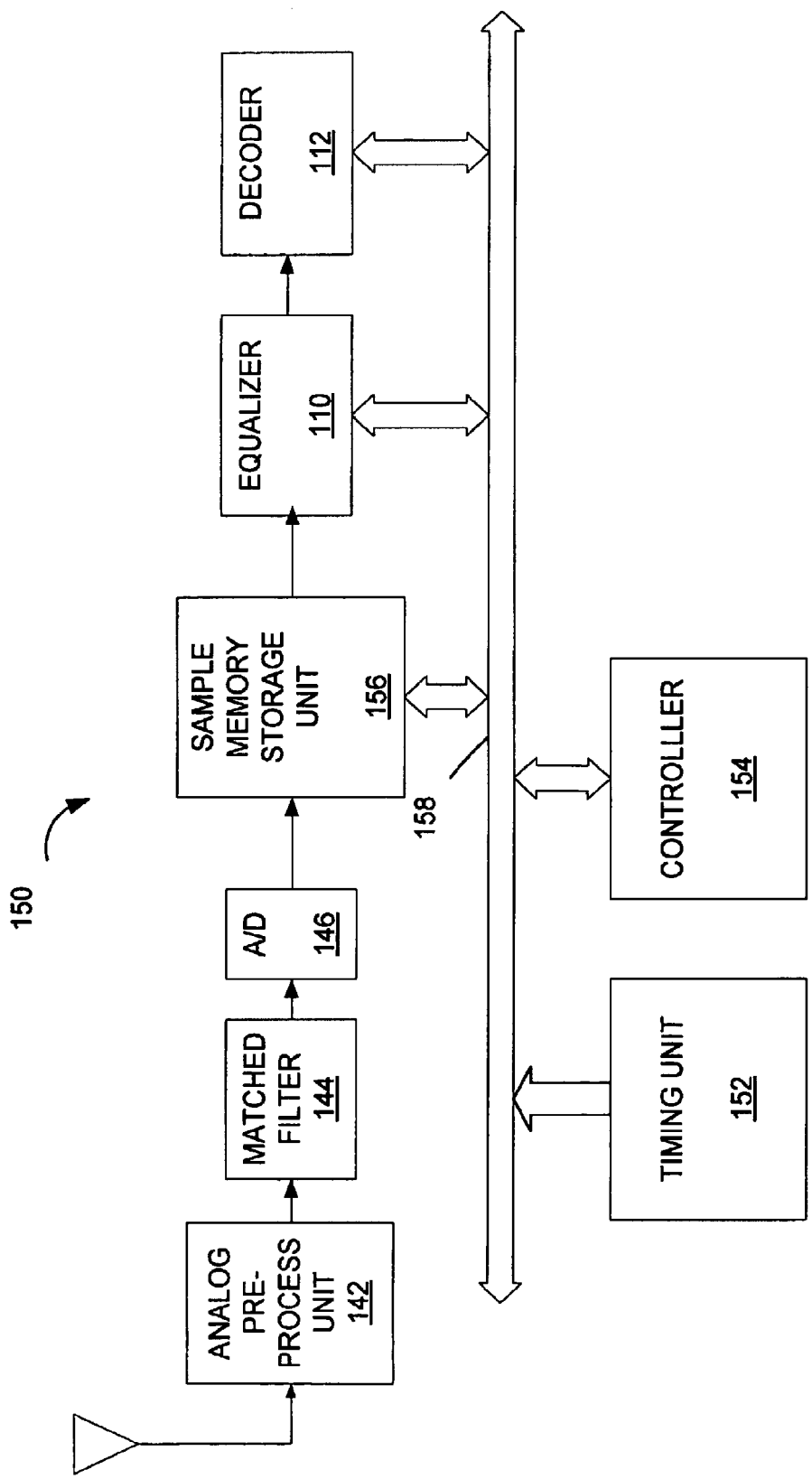
FIG. 2 is a block diagram of a receiver employing a linear equalizer.

Communications systems are used for transmission of information from one device to another. Before transmission, information is encoded into a format suitable for transmission over a communication channel. The communication channel may be a transmission line or free space between the transmitter and the receiver. As the signal propagates through the channel, the transmitted signal is distorted by imperfections in the channel. Furthermore, the signal experiences degradation from noise and interference picked up during transmission. An example of interference commonly encountered in bandlimited channels is called inter-symbol interference (ISI). ISI occurs as a result of the spreading of a transmitted symbol pulse due to the dispersive nature of the channel, which results in an overlap of adjacent symbol pulses. At the receiver, the signal is processed and translated into the original pre-encoded form. Both the transmitter and receiver are designed to minimize the effects of channel imperfections and interference. For the purposes of this disclosure, interference or distortion due to channel imperfections, or any combination thereof will be referred to generally as noise.

Various receiver designs may be implemented to compensate for noise caused by the transmitter and the channel. By way of example, an equalizer is a common choice for dealing with ISI. An equalizer may be implemented with a transversal filter, i.e. a delay line with T-second taps (where T is the symbol duration). The contents of the taps are amplified and summed to generate an estimate of the transmitted symbol. The tap coefficients are adjusted to reduce interference from symbols that are adjacent in time to the desired symbols. Commonly, an adaptive equalization technique is employed whereby the tap coefficients are continually and automatically adjusted. The adaptive equalizer uses a prescribed algorithm, such as Least Mean Square (LMS) or Recursive Least Squares (RLS), to determine the tap coefficients. The symbol estimate is coupled to a decision-making device such as a decoder or a symbol slicer.

The ability of a receiver to detect a signal in the presence of noise is based on the ratio of the received signal power and the noise power. This ratio is commonly known as the signal-to-noise power ratio (SNR), or the carrier-to-interference ratio (C/I). Industry usage of these terms, or similar terms, is often interchangeable, however, the meaning is the same. Accordingly, any reference to C/I herein will be understood by those skilled in the art to encompass the broad concept of measuring the effects of noise at various points in the communications system.

Typically, the C/I may be determined in the receiver by evaluating symbol estimates of a known transmitted symbol sequence. This may be accomplished in the receiver by computing the C/I for the transmitted pilot signal. Since the pilot signal is known, the receiver may compute the C/I based on the symbol estimates from the equalizer. The resultant C/I computation may be used for a number of purposes. In communications systems employing a variable rate data request scheme, the receiver may communicate to the transmitter the maximum data rate it may support based on the C/I. Furthermore, if the receiver includes a turbo decoder, then depending on the transmitted constellation, the Log Likelihood Ratio (LLR) computation needs an accurate estimate of the C/I.

Equalizers in wireless communication systems are designed to adjust to time-varying channel conditions. As the channel characteristics change, the equalizer adjusts its response accordingly. Such changes may include variations in the propagation medium or the relative motion of the transmitter and receiver, as well as other conditions. As discussed hereinabove, adaptive filtering algorithms are often used to modify the equalizer tap coefficients. Equalizers that employ adaptive algorithms are generally referred to as adaptive equalizers. Adaptive algorithms share a common property: adaptation speed decreases as the number of equalizer taps increases. Slow adaptation impacts the tracking behavior of adaptive equalizers. A "long" equalizer, i.e., an equalizer having a large number of taps, is desirable as long equalizers more accurately invert channel distortions resulting in good steady state performance. Long equalizers, however, react more slowly to channel variations leading to poor transient behavior, i.e., poor performance when the channel is rapidly varying. An optimum number of taps balances such considerations and compromises between good steady-state performance and good transient performance.

In practice, determining the optimum number of taps is difficult as the optima depends on a variety of conditions and goals, including but not limited to, the instantaneous response of the channel, and the rate of variation of the channel. So it is difficult to determine, a priori, the optimum number of taps if the equalizer is to be used on a variety of channels, in a variety of time-varying conditions.

As disclosed herein, one embodiment selects an optimum number of taps by training multiple "virtual" adaptive equalizers, of different lengths, operating in "parallel." The term "parallel" as used herein refers to the training of these multiple virtual equalizers on the same set of samples. The term "virtual" as used herein refers to the fact that each of these equalizers uses the same piece of physical hardware in different configurations. How the hardware is configured differently depends, for example, on the length of the equalizer, or other equalizer parameters. In practice, a predetermined, fixed length equalizer is used, wherein the effective length of the equalizer is dynamically adjusted by setting certain tap coefficients to zero. The multiple adaptive equalizers are trained in "parallel", and one equalizer configuration is selected based on performance. For example, the selection may correspond to the lowest Mean Square Error (MSE) between a transmitted pilot signal and the estimate generated by the equalizer of a given length, or the highest Signal to Interference and Noise Ratio (SINR) at the equalizer output, or some other criteria. The performance measure or estimate provides a means for comparing the various equalizer configurations. The selected equalizer configuration is then used for processing the received data signal.

A receiver is termed "universal" if its performance is optimum over the "universe" of possible channel conditions and rates of channel variation. The receiver with multiple virtual parallel equalizers is "universal" if the equalizer selected on the basis of the MSE estimate or C/I estimate is, in fact, the best equalizer configuration among all evaluated configurations. Thus, accurate MSE estimates or C/I estimates are necessary to make a receiver with multiple virtual parallel equalizers "universal." An exemplary embodiment of such a receiver is described hereinbelow.

The word "exemplary" is used herein to mean "serving as an example, instance, or illustration." Any embodiment described herein as "exemplary" is not necessarily to be construed as preferred or advantageous over other embodiments.

FIG. 1A illustrates a portion of the components of a communication system 100. Other blocks and modules may be incorporated into a communication system in addition to those blocks illustrated. Bits produced by a source (not shown) are framed, encoded, and then mapped to symbols in a signaling constellation. The sequence of binary digits provided by the source is referred to as the information sequence. The information sequence is encoded by encoder 102 which outputs a bit sequence. The output of encoder 102 is provided to mapping unit 104, which serves as the interface to the communication channel. The mapping unit 104 maps the encoder output sequence into symbols y(n) in a complex valued signaling constellation. Further transmit processing, including modulation blocks, as well as the communication channel and analog receiver processing, are modeled by section 120.

FIG. 1B illustrates some of the details included within section 120 of FIG. 1A. As illustrated in FIG. 1B, the complex symbols y(n) are modulated onto an analog signal pulse, and the resulting complex baseband waveform is sinuosoidally modulated onto the in-phase and quadrature-phase branches of a carrier signal. The resulting analog signal is transmitted by an RF antenna (not shown) over a communication channel. A variety of modulation schemes may be implemented in this manner, such as M-ary Phase Shift Keying (M-PSK), $2^M$-ary Quadrature Amplitude Modulation ($2^M$ QAM), etc.

Each modulation scheme has an associated "signaling constellation" that maps one or more bits to a unique complex symbol. For example, in 4-PSK modulation, two encoded bits are mapped into one of four possible complex values $\{1,i,-1,-i\}$. Hence each complex symbol y(n) may take on four possible values. In general for M-PSK, $\log_2 M$ encoded bits are mapped to one of M possible complex values lying on the complex unit circle.

Continuing with FIG. 1a, at the receiver, the analog waveform is down-converted, filtered and sampled, such as at a suitable multiple of the Nyquist rate. The resulting samples are processed by the equalizer 110 which corrects for signal distortions and other noise and interference introduced by the channel, as modeled by section 120. The equalizer 110 outputs estimates of the transmitted symbols y(n). The symbol estimates are then processed by a decoder 112 to determine the original information bits, i.e., the source bits that are the input to encoder 102.

The combination of a pulse-filter, an I-Q modulator, the channel, and an analog processor in the receiver's front-end, illustrated in FIG. 1A and FIG. 1B, is modeled by a linear filter 106 having an impulse response $\{hk\}$ and a z-transform H(z), wherein the interference and noise introduced by the channel are modeled as Additive White Gaussian Noise (AWGN).

FIG. 1B details processing section 120 as including a front end processing unit 122 coupled to baseband filters 126 and 128 for processing the In-phase (I) and Quadrature (Q) components, respectively. Each baseband filter 126, 128 is then coupled to a multiplier for multiplication with a respective carrier. The resultant waveforms are then summed at summing node 134 and transmitted over the communication channel to the receiver. At the receiver, an analog pre-processing unit 142 receives the transmitted signal, which is processed and passed to a matched filter 144. The output of the matched filter 144 is then provided to an Analog/Digital (A/D) converter 146. Note that other modules may be implemented according to design and operational criteria. The components and elements of FIGS. 1A and 1B are provided for an understanding of the following discussion and are not intended to be a complete description of a communication system.

High Data Rate Communication Systems

Throughout the following discussion a specific high data rate system is described for clarity. Alternate systems may be implemented that provide transmission of information at high data rates. For CDMA communications systems designed to transmit at higher data rates, such as a High Data Rate (HDR) communications system, a variable data rate request scheme may be used to communicate at the maximum data rate that the C/I may support. The HDR communications system is typically designed to conform to one or more standards such as the "cdma2000 High Rate Packet Data Air Interface Specification," 3GPP2 C.S0024, Version 2, Oct. 27, 2000, promulgated by the consortium "$3^{rd}$ Generation Partnership Project." The contents of the aforementioned standard is incorporated by reference herein.

A receiver in an exemplary HDR communications system employing a variable rate data request scheme is shown in FIG. 2. The receiver 150 is a subscriber station in communication with a land-based data network by transmitting data on a reverse link to a base station (not shown). The base station receives the data and routes the data through a base station controller (BSC) (also not shown) to the land-based network. Conversely, communications to the subscriber station 150 may be routed from the land-based network to the base station via the BSC and transmitted from the base station to the subscriber unit 150 on a forward link. The forward link refers to the transmission from the base station to the subscriber station and the reverse link refers to the transmission from the subscriber station to the base station.

In the exemplary HDR communications system, the forward link data transmission from the base station to the subscriber station 150 should occur at or near the maximum data rate which may be supported by the forward link. Initially, the subscriber station 150 establishes communication with the base station using a predetermined access procedure. In this connected state, the subscriber station 150 may receive data and control messages from the base station, and is able to transmit data and control messages to the base station. The subscriber station 150 then estimates the C/I of the forward link transmission from the base station. The C/I of the forward link transmission may be obtained by measuring the pilot signal from the base station. Based on the C/I estimation, the subscriber station 150 transmits to the base station a data rate request message as a Data Rate Control (DRC) message on an assigned DRC channel. The DRC message may contain the requested data rate or, alternatively, an indication of the quality of the forward link channel, e.g., the C/I measurement itself, the bit-error-rate, or the packet-error-rate. The base station uses the DRC message from the subscriber station 150 to efficiently transmit the forward link data at the highest possible rate.

The BSC (not shown) may interface with a packet network interface, a PSTN, and/or other base stations, and serves to coordinate the communication between subscriber stations and other users.

Figure 8:
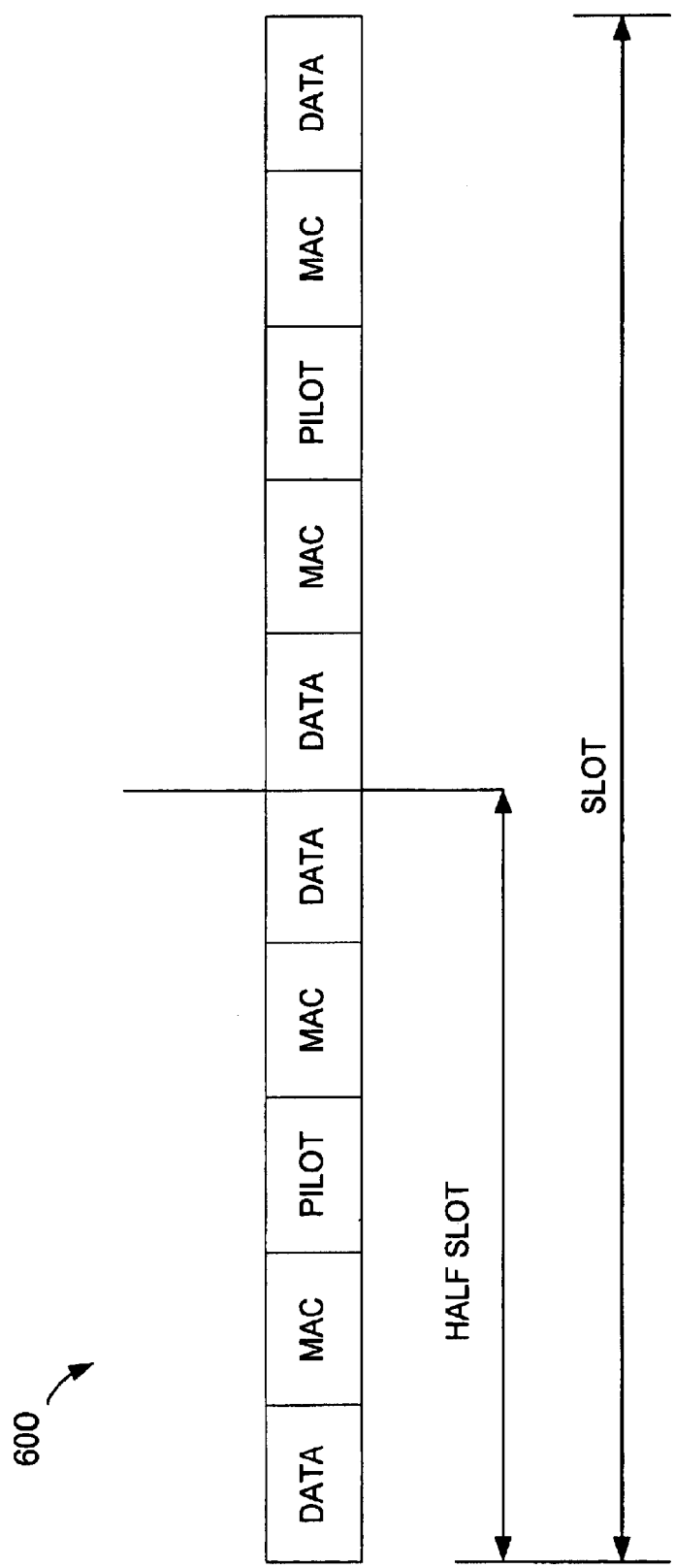
FIG. 8 is a block diagram of a slot structure in a High Data Rate system.

The forward link pilot channel provides a pilot signal, which may be used by the subscriber station 150 for initial acquisition, phase recovery, and timing recovery. In addition, the pilot signal may also be used by subscriber station 150 to perform the C/I measurement. In the described exemplary embodiment, each time slot on the forward link is 2048 chips long with two pilot bursts occurring at the end of the first and third quarters of the time slot. Each pilot burst is 96 chips in duration. An example of a slot in an HDR system is illustrated in FIG. 8, wherein each slot has two parts. Each half slot includes a pilot burst.

The forward link transmission is received by an antenna at the subscriber station 150. The received signal is routed from the antenna to a receiver within analog preprocessing unit 142, matched filter 144, Analog to Digital (A/D) converter. The receiver filters and amplifies the signal, down-converts the signal to baseband, quadrature demodulates the baseband signal, and digitizes the baseband signal. The digitized baseband signal is coupled to a demodulator. The demodulator includes carrier and timing recovery circuits and further includes the equalizer 110. The equalizer 110 compensates for ISI and generates symbol estimates from the digitized baseband signal. The symbol estimates are coupled to a controller 154 via communication bus 158. The controller then generates the DRC message. The output of the equalizer 110 is also provided to decoder 112. The decoder 112, the equalizer 110, and the controller 154 are each coupled to communication bus 158.

Figure 4:
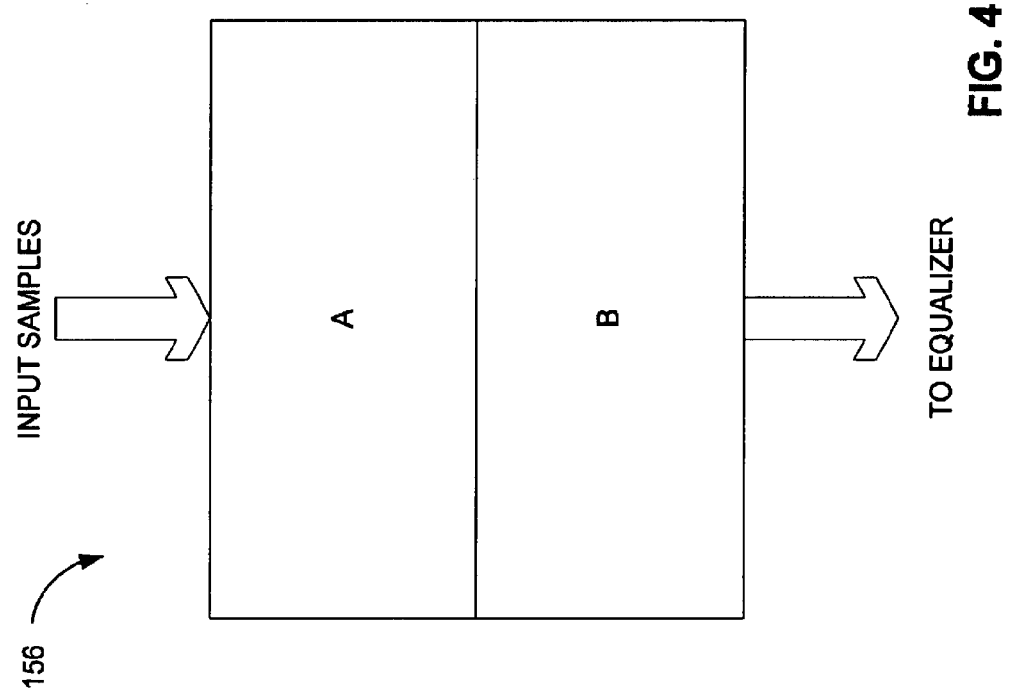
FIG. 4 is a diagram of a sample memory storage unit.

In addition to generating the DRC message, the controller 154 may be used to support data and message transmissions on the reverse link. The controller 154 may be implemented in a microcontroller, a microprocessor, a digital signal processing (DSP) chip, an ASIC programmed to perform the function described herein, or any other implementation known in the art. A timing unit 152 is also coupled to the communication bus 158. The exemplary embodiment includes a sample memory storage unit 156 coupled to the equalizer 110 and the controller 154 via the communication bus 158. Sample memory storage unit 156 is illustrated in FIG. 4 and described hereinbelow.

Virtual Parallel Equalizers

As discussed hereinabove, the performance of a universal receiver is effectively optimized over multiple channel types and for multiple rates of channel variations. One method of realizing a universal receiver is by using parallel equalizers. This option is not without cost. In particular, the cost of the hardware to implement parallel Finite Impulse Response (FIR) filters is prohibitive. By taking advantage of the processing speed and flexibility of the hardware, however, parallel equalizers may be implemented virtually.

Figure 3:
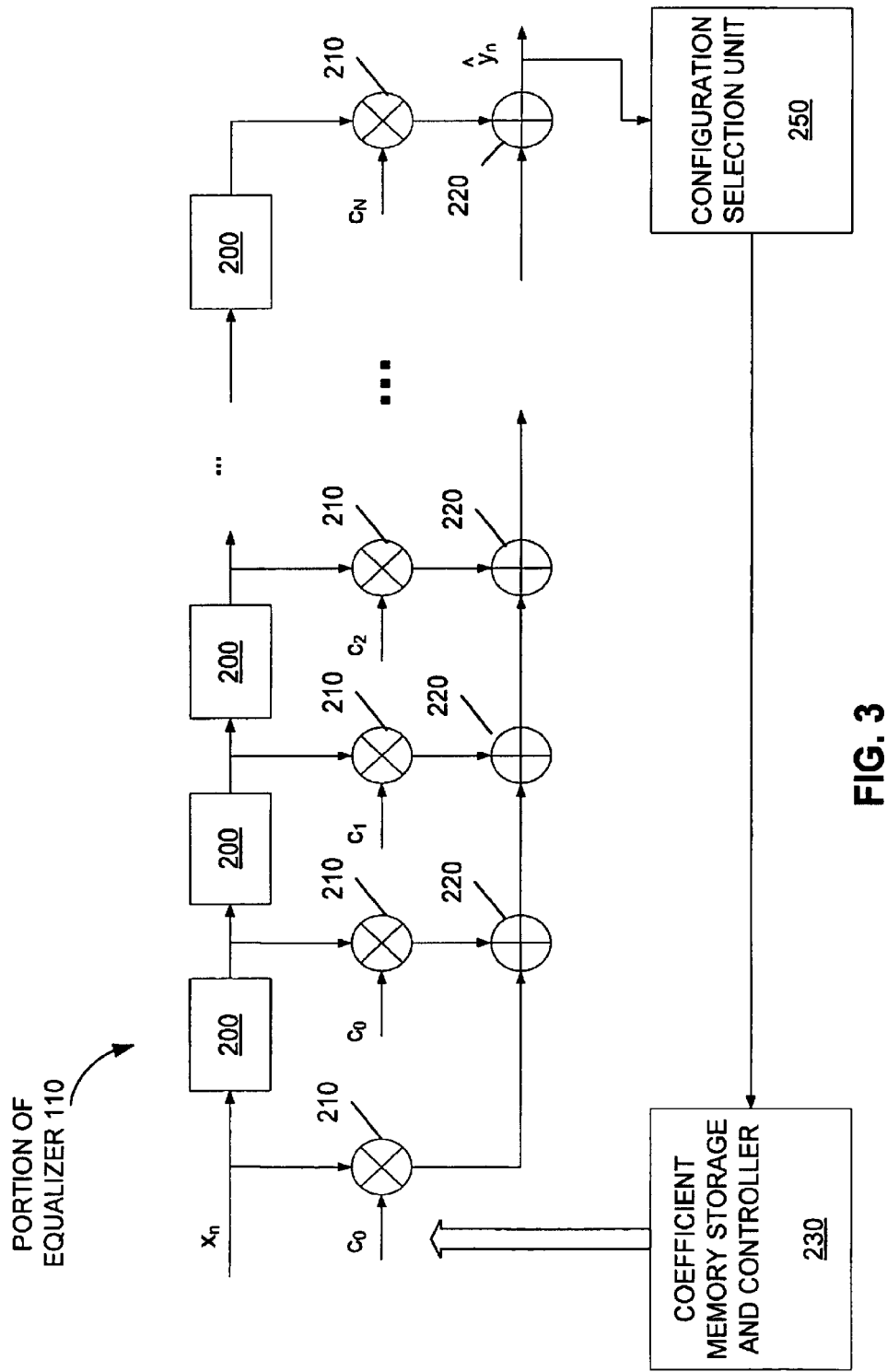
FIG. 3 is a diagram of a linear equalizer as in FIG. 2.

The equalizer 110 is manipulated within receiver 150 so as to act as a set of virtual parallel equalizers. A portion of the equalizer 110 is further illustrated in FIG. 3. According to the exemplary embodiment, the received samples $x_n$ are stored in sample memory storage unit 156 prior to application to the equalizer 110. The memory storage unit 156 is designed to store multiple half slots of samples concurrently. In this way, while one half slot of samples is being written into the sample memory storage unit 156, the previous half slot of samples is read and processed by the equalizer 110. For example, for a half slot having a duration of T seconds, such as in HDR wherein T=0.833 ms, read/write collisions of the memory may be avoided as long as each half slot of samples may be read and processed in less than T seconds. Processing a half slot of samples involves training the equalizer coefficients on the pilot burst within the half slot, such as via an adaptive filtering algorithm, and filtering one or more data segments in the half slot using the equalizer 110. According to the present embodiment, the equalizer implements an FIR filter having an internal clock rate higher than the symbol transmission rate. According to this embodiment, the FIR implementation provides the ability to implement virtual equalizers. Such training and filtering takes only a fraction of the allowable time T. For example, it may take 0.1T and 0.3T seconds, respectively to train the equalizer and filter the data segments. If no other signal processing were needed, the equalizer 110 would be idle for approximately 0.6T seconds, allowing 0.4T seconds for reuse of the equalizer 110.

The sample memory storage unit 156 is a volatile memory allowing writing and rewriting of received sample information, such as a Read Access Memory (RAM). The sample memory storage unit 156 is illustrated in FIG. 4, and has two portions: A and B. Samples from the A/D output are stored sequentially in the sample memory storage unit 156 and provided therefrom to the equalizer 110. During one half slot, samples from the A/D output may be written sequentially into the portion of RAM denoted A. While these samples are being written in, the equalizer may read and process samples from the portion of RAM denoted B. As long as the equalizer takes less time to read and process samples from RAM portion marked B than the time taken to fill the RAM portion marked A, there are no read/write collisions in the memory. When the equalizer is finished processing the samples from B and once RAM portion A is filled, the equalizer next processes the samples of the next half slot, i.e., the samples in RAM portion A, whereas the A/D output samples are now sequentially written into RAM portion B.

Equalizer 110 includes a plurality of delay units 200. Coupled between delay units 200 are multipliers or taps 210. Each multiplier has a corresponding coefficient, which may be considered as weighting factors for various tap configurations. The coefficients are identified as $c_i$, for i=0, 1, ..., N−1. Each of the multipliers 210 is then coupled to a series of adders 220. The adders 220 are coupled in series and provide a cumulative output $\hat{y}_n$, which includes terms for each tap value multiplied by a corresponding coefficient value. The output $\hat{y}_n$ of equalizer 110 is the estimate of the transmitted symbol. One or more outputs $\hat{y}_n$ are provided to configuration selection unit 250, which stores the resultant outputs $\{\hat{y}_n\}$ for each configuration. Each configuration has a different set of coefficient values. Note that changing the coefficient values so as to set one or more of the coefficients to zero effectively changes the length of the equalizer. For example, if coefficients $c_0, c_1, c_{N-2}$ and $c_{N-1}$ are set to zero, the equalizer length is effectively reduced from N taps to N−4 taps. For each half slot, the configuration selection unit 250 analyzes the outputs, i.e., the symbol estimates $\{\hat{y}_n\}$ of each configuration and determines the best configuration for that half slot. The configuration selection unit 250 then provides the configuration information, i.e., coefficient values, to the coefficient memory storage and controller 230. The controller 230 provides the appropriate coefficient values to the multipliers 210. Note that according to one embodiment, configuration selection unit 250 estimates the MSE between the outputs $\{\hat{y}_n\}$ and known pilot symbols, and determines the configuration with the smallest estimated MSE. In another embodiment, configuration selection unit 250 estimates the C/I given the outputs $\{\hat{y}_n\}$, and determines the configuration with the highest estimated C/I therefrom.

In one embodiment, the equalizer 110 is designed for the longest length needed for the system. The equalizer 110 comprises an N tap FIR, having N coefficients, and a corresponding delay line. The FIR coefficients for the equalizer 110 are loaded with desired values. A set of intermediate equalizer lengths $\{N_i: i=1, ..., n\}$ are selected for n "virtual" equalizers. The virtual equalizer refers to the full length equalizer with coefficients set to zero to effectively change the length of the equalizer. The selected set of lengths are determined according to:

$$0 = N_0 < 1 \leq N_1 < N_2 < \ldots < N_n \leq N < N_{n+1} = \infty. \quad (1)$$

If the method assumes N and each of the $N_i$ are odd, the i-th virtual equalizer tap coefficients may be written as $\{h_i(k) : |k| \leq (N-1)/2\}$, with the additional restriction:

$$h_i(k) = 0, \text{ for } (N_i - 1)/2 < |k| \leq (N-1)/2. \quad (2)$$

Note that the i-th virtual equalizer has only $N_i$ non-zero coefficients, i.e., the i-th virtual equalizer has length $N_i$. The equalizer 110 includes coefficient memory storage and controller 230 for storing the equalizer coefficients $\{h_i(k)\}$ for each of the n virtual equalizers.

Figure 5:
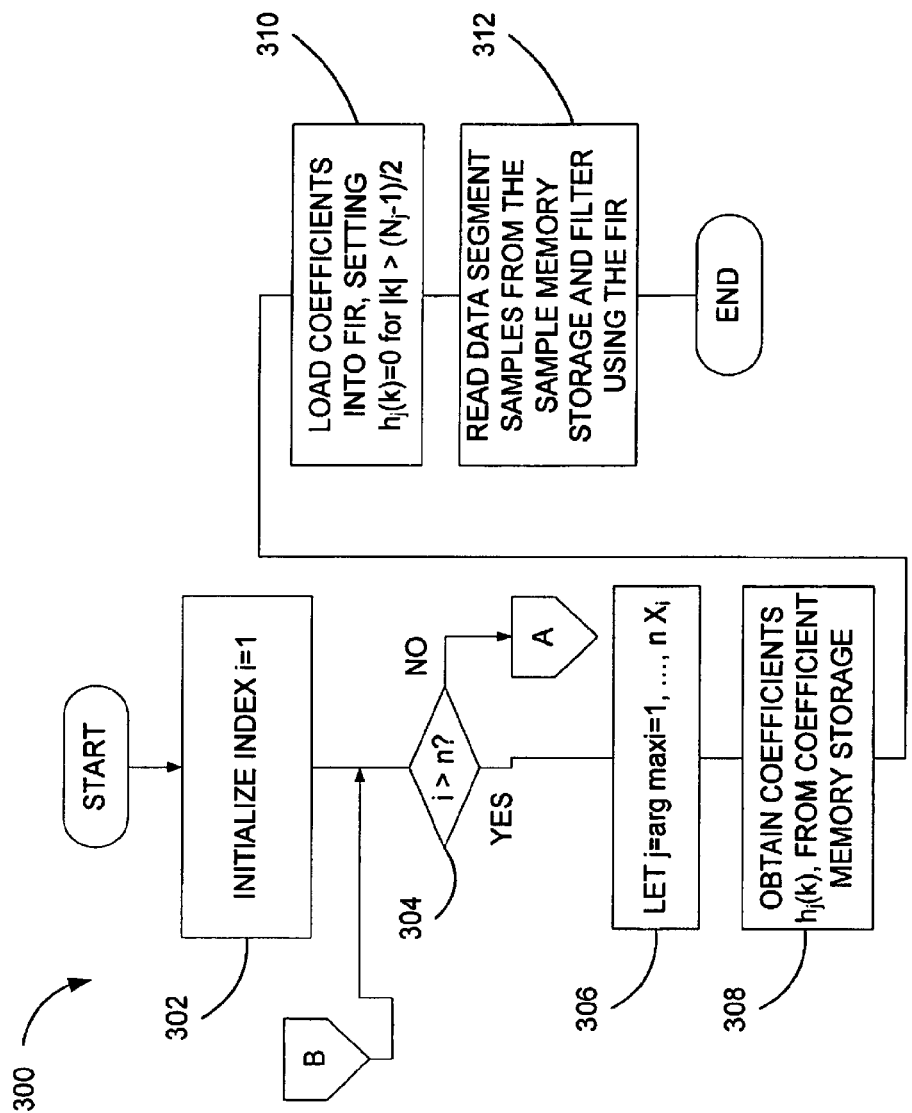
FIGS. 5 and 6 illustrate a process for implementing multiple "virtual parallel" equalizers.
Figure 6:
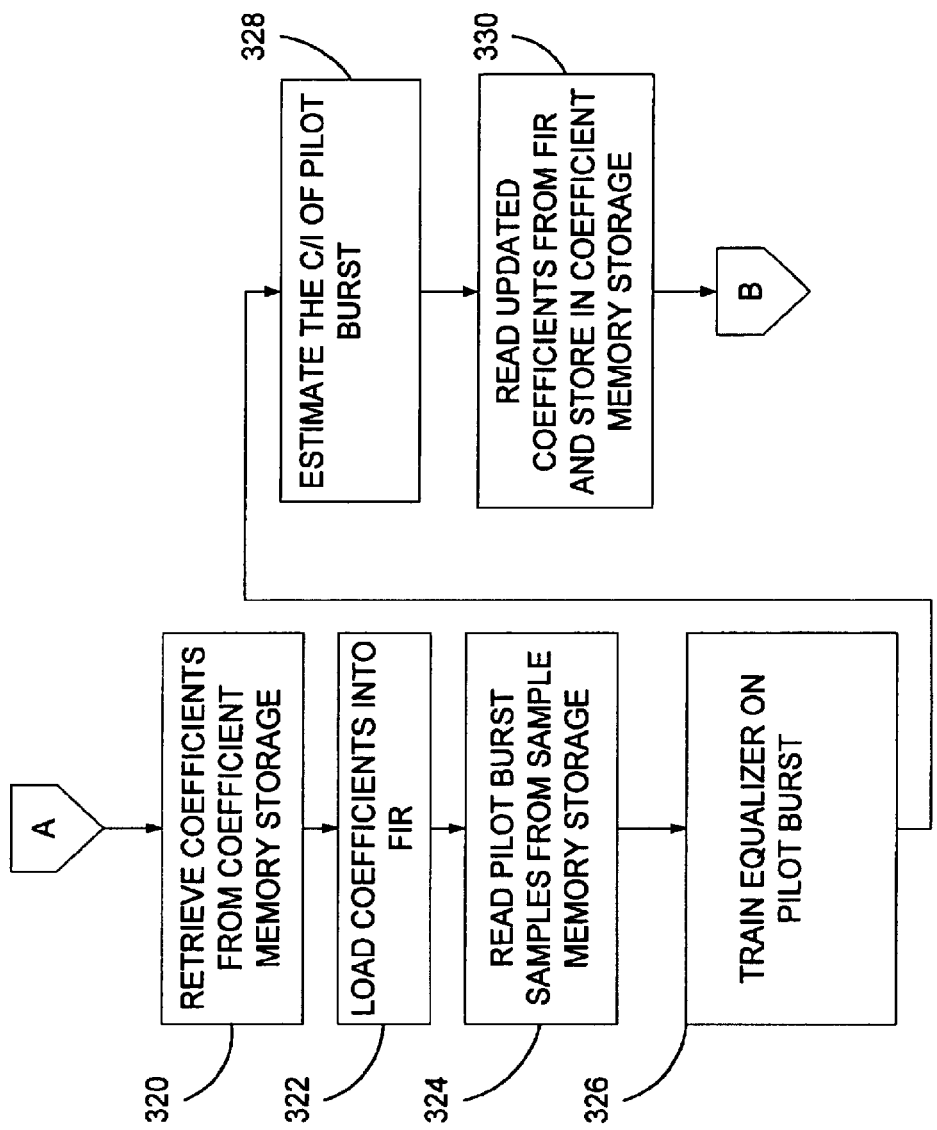

The FIG. 5 illustrates one method 300 for processing samples in an equalizer 110. The process initializes an index as i=1 at step 302. At decision diamond 304 the index is compared to the number of virtual equalizers n. For the index i less than or equal to n, processing continues to step 320 of FIG. 6 to retrieve coefficients $\{h_i(k) : |k| < (N_i - 1)/2\}$ from coefficient memory storage and controller 230. The coefficients are then loaded into the FIR at step 322. The process then reads the pilot burst samples from the sample memory storage unit 156 at step 324. The equalizer then trains on the pilot burst while enforcing the restriction of Equ. (2) provided hereinabove at step 326. The training may be done by disabling the adders 220 for certain coefficients during coefficient updates for an adaptive algorithm. Note that the adaptive algorithm step size may also need to be adjusted to recognize the equalizer has $N_i \leq N$ taps. The receiver 150, concurrently with the training of the FIR of the equalizer 110, estimates the C/I or the MSE of the pilot burst at step 328. After training on the pilot burst, the process reads the updated coefficients out of the FIR and returns the values to the coefficient memory storage 230 at step 330. The estimated C/I are referred to as $X_i$. Processing returns to step 304 of FIG. 5 and step 306 if i>n, to set j=arg $\max_{i=1, \ldots, n} X_i$. The process then sets the equalizer length as the length of j-th virtual equalizer, namely $N_j$, which is deemed optimal on the current half slot at step 308. The corresponding coefficients $\{h_j(k) : |k| < (N_j - 1)/2\}$ are retrieved from coefficient memory storage 230. The coefficients are then loaded into the equalizer 110 at step 310, setting $h_j(k) = 0$, for $(N_j - 1)/2 < |k| < (N-1)/2$. Data segment samples are then read from sample memory storage unit 156 and filtered using the FIR at step 312.

Figure 7:
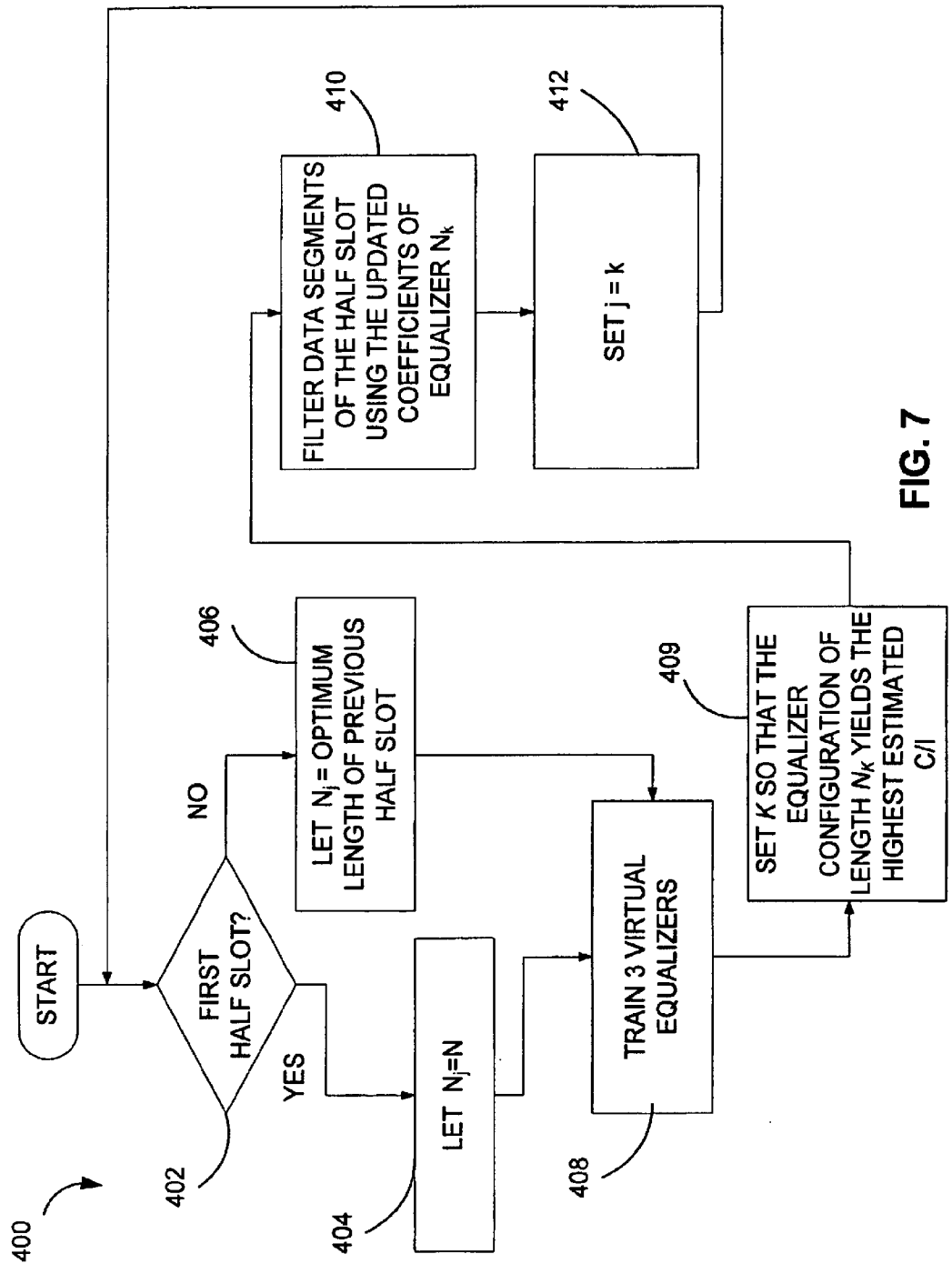
FIG. 7 illustrates a process for implementing three "virtual parallel" equalizers.

On channels typical in wireless communication systems, the optimum equalizer length is likely to change only slowly, so the optimum equalizer length will most likely not change over a large number of consecutive half slots. Consider three equalizers in parallel, having lengths $N_j, N_{j-1}$, and $N_{j+1}$. The length $N_j$ is selected as the optimal length on the previous half slot, i.e., the j-th configuration is optimal on the previous half slot. The lengths $N_j, N_{j-1}$ and $N_{j+1}$ are chosen according to Equ. (1). Rather than train the entire family of n virtual equalizers at all times, a modified embodiment trains only three virtual equalizers. The method 400 is illustrated in FIG. 7. The process is started with j set to n and the length $N_j$ set to N. The three virtual equalizers are trained at 408, of lengths $\max(N_{j-1}, 1)$, $N_j$, and $\min(N_{j-1}, N)$, respectively. Set k so that the equalizer configuration of length $N_k$ yields the highest estimated C/I. At step 410, the process filters data segments of the half slot using the updated coefficients of the equalizer $N_k$. The index j is set equal to k at step 412 and the process returns to decision diamond 402. The process continues on the next half slot with j set to k and $N_j$ set to $N_k$. Three equalizers are provided as an exemplar, wherein extension to any number of virtual equalizers is implemented in a similar manner.

While the virtual parallel equalizer discussed hereinabove considers an equalizer incorporating a specific filter configuration, namely an FIR filter of fixed, predetermined length, the concepts may be applied to any equalizer configuration. Additionally, other equalizer parameters may be incorporated into the selection process. An equalizer parameter encompasses any of the variables that define the function and operation of the equalizer. Equalizer parameters include, but are not limited to, a DC offset value or a phase offset value for the input samples, or a sector identifier. Additionally, training may be performed for various equalizer configurations wherein multiple parameters are changed for each configuration. For example, among the equalizer configurations trained in parallel, one configuration could be an equalizer of length L assigned to sector M. Another configuration could be an equalizer of length L' assigned to sector M'. For each configuration a performance measurement or estimate, such as MSE, C/I or SINR, is stored. The performance measurement for each configuration is then compared and an optimum configuration determined.

Figure 9:
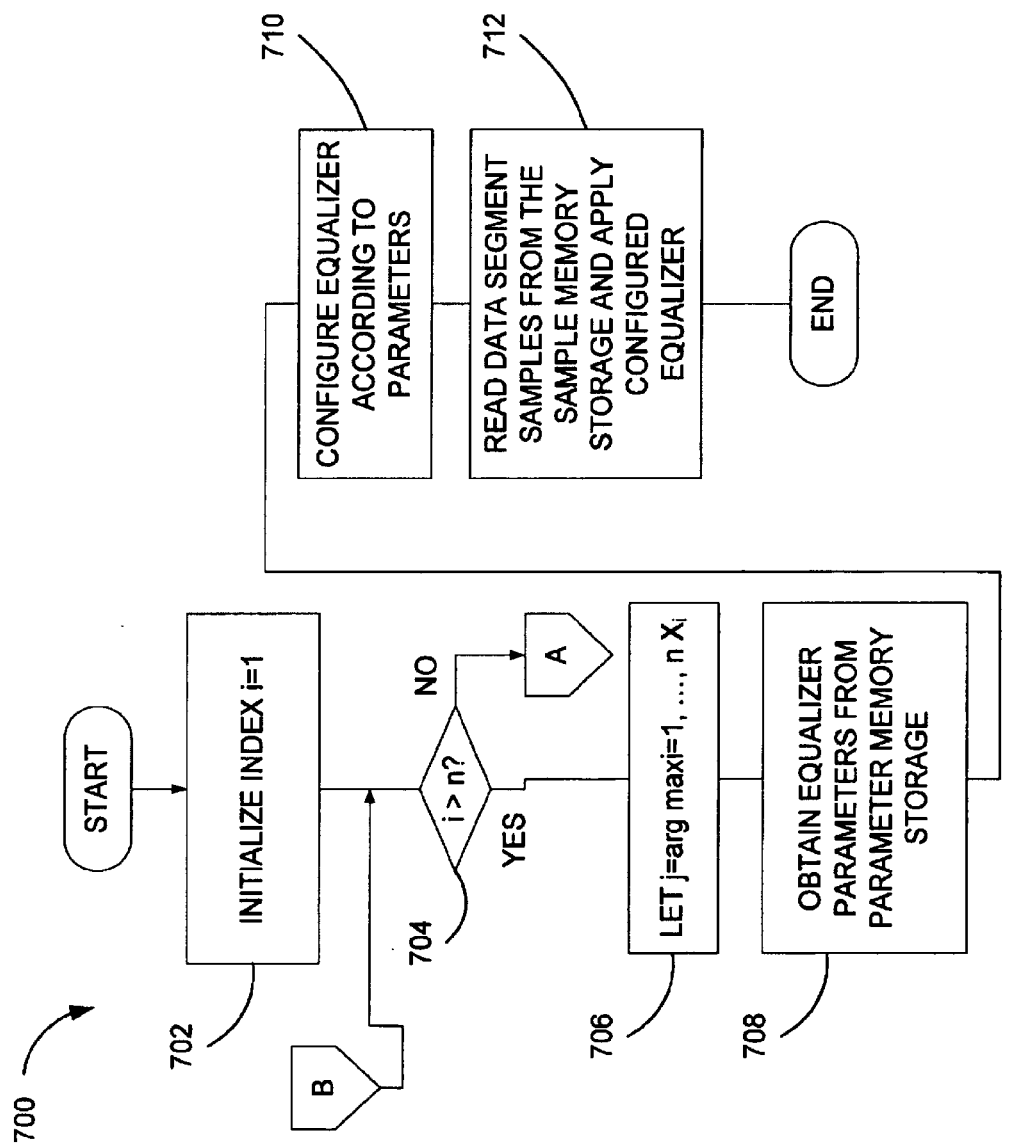
FIGS. 9 and 10 illustrate a process for training an equalizer for a variety of equalizer parameters.
Figure 10:
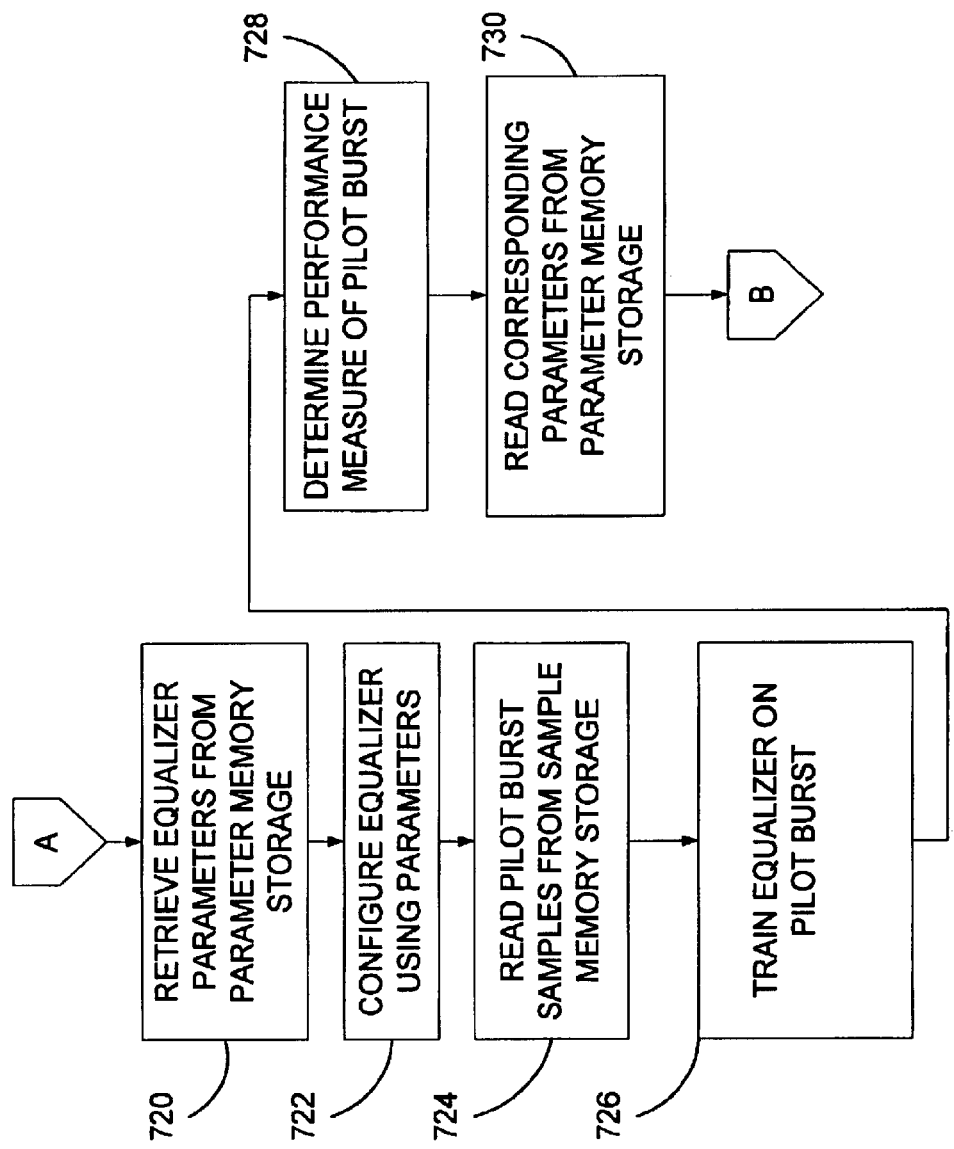

The general case is illustrated in FIGS. 9 and 10. The method 700 for processing samples in an equalizer 110 initializes an index as i=1 at step 702. At decision diamond 704 the index is compared to the number of virtual equalizers n. For the index i less than or equal to n, processing continues to step 720 of FIG. 10 to retrieve equalizer parameters from parameter memory storage, similar to memory storage and controller 230. The parameters are then used to configure the equalizer at step 722. The process then reads the pilot burst samples from the sample memory storage unit, such as sample memory storage unit 156, at step 724. The equalizer then trains on the pilot burst at step 726. The receiver 150, concurrently with the training of equalizer 110, estimates a performance measure of the pilot burst at step 728. After training on the pilot burst, the process reads the corresponding parameters and returns the values to the parameter memory storage at step 730. The measured performance parameters are referred to as $X_i$. Processing returns to step 706 of FIG. 9, to set j=arg max$_{i=1, \ldots, n}$ $X_i$. The process then selects the equalizer length as the length of virtual equalizer $N_j$, which is optimal on the current half slot at step 708. The corresponding equalizer parameters are retrieved from parameter memory storage. The parameters are then used to configure the equalizer 110 at step 710. Data segment samples are then read from sample memory storage unit and processed using the configured equalizer at step 712.

Optimization of the equalizer 110 may be performed by training parallel equalizers, wherein each of the parallel equalizers defines a configuration of the equalizer 110. The optimum configuration is selected by comparing the performance of each configuration. Parallel equalizers selected for such training and comparison may be defined according to any of the parameters of the equalizer, or a combination of equalizer parameters. For example, in one scenario, parallel equalizers may be implemented as decision feedback equalizers and the different configurations may separately specify the lengths of the feedback filter and the feedforward filter to be used in each configuration. In another scenario, equalizer parameters may include a sector identifier, wherein the receiver is able to receive data samples from multiple transmitters, such as in a soft handoff situation. In this case, the sector identifier provides a further condition or equalizer parameter for comparison, the goal being to select the best sector for reception. FIG. 11 illustrates a table of configurations indexed 1 through N that may be used for optimizing the equalizer 110. A first configuration is defined by the FIR 110 having a length L1, wherein the length refers to the number of filter taps having non-zero coefficients and the receiving sector identifying sector S1. The other configurations are given similarly, wherein, L2 may not equal L1, and sectors S1 and S2 may be different sectors within the communication system. The various configurations are applied to the equalizer, and a performance measurement made or estimated. The performance measures are then compared for each criterion to determine the optimum configuration. The optimum configuration is then applied to the data stored in the sample memory storage. In this case, the optimum configuration also provides an indication to the receiver as to the best sector for optimum reception. Any number of parameters and parameter combinations may be employed.

In the examples provided hereinabove, the use of the sample memory storage enables the implementation of virtual parallel equalizers. By storing the samples received at a predetermined transmission rate, the receiver is provided time to train the equalizer for a variety of configurations, and thereby select the optimum configuration and adjust thereto prior to actually processing the sample data. The pilot burst is also stored in the sample memory storage and is retrieved therefrom for use in training the equalizer.

Performance Measurement

As described hereinabove, the equalizer configuration may be selected based on a measurement of the SINR, C/I or other performance criteria. Other performance criteria may include, for example, the Mean Square Error of the equalizer configuration measured on the pilot samples. For example, if the equalizer outputs on pilot, samples are given by $\{\hat{y}_n: n=1, \ldots, K\}$ and the desired pilot symbols are denoted by $\{\hat{y}_n: n=1, \ldots, K\}$, the Mean Square Error (MSE) for this configuration is given by:

$$MSE = \frac{1}{K}\sum_{n=1}^{K} |\hat{y}_n - y_n|^2. \tag{3}$$

One definition of the SINR or C/I estimate is the following:

$$SINR = \frac{1}{MSE} - 1. \tag{4}$$

Other definitions or performance measures are also possible.

FIGS. 12A–12B illustrate a method of estimating a transmitted signal from a received sample using an equalizer defined by a set of parameters.

Figure 13A:
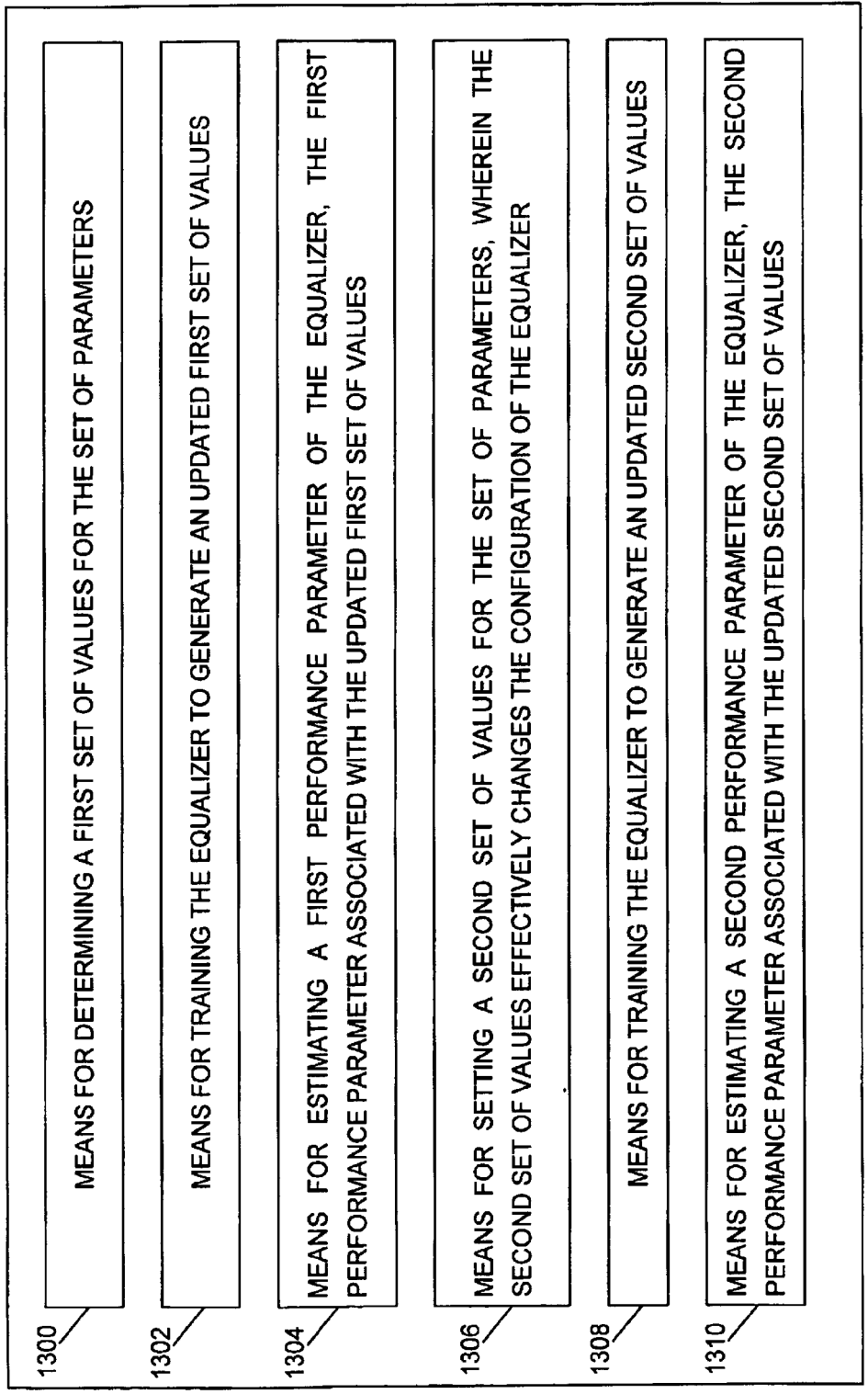

FIGS. 13A–13B illustrate an apparatus for estimating a transmitted signal from a received sample using an equalizer defined by a set of parameters.

In block 1200 of FIG. 12A, the method includes determining a first set of values for the set of parameters. In block 1202, the method includes training the equalizer to generate an updated first set of values. In block 1204, the method includes estimating a first performance parameter of the equalizer. The first performance parameter is associated with the updated first set of values. In block 1206, the method includes setting a second set of values for the set of parameters, wherein the second set of values effectively changes the configuration of the equalizer. In block 1208, the method includes training the equalizer to generate an updated second set of values. In block 1210, the method includes estimating a second performance parameter of the equalizer. The second performance parameter is associated with the updated second set of values. In block 1212 of FIG. 12B, the method includes comparing the first performance parameter to the second performance parameter. In block 1214, the method includes selecting one of the first and second sets of values based on comparing the first and second performance parameters. In block 1216, the method includes configuring the equalizer using the result of selecting.

The apparatus of FIGS. 13A–13B may include means 1300 for determining a first set of values for the set of parameters; means 1302 for training the equalizer to generate an updated first set of values; means 1304 for estimating a first performance parameter of the equalizer, the first performance parameter associated with the updated first set of values; means 1306 for setting a second set of values for the set of parameters, wherein the second set of values effectively changes the configuration of the equalizer; means 1308 for training the equalizer to generate an updated second set of values; means 1310 for estimating a second performance parameter of the equalizer, the second performance parameter associated with the updated second set of values; means 1312 for comparing the first performance parameter to the second performance parameter; means 1314 for selecting one of the first and second sets of values based on comparing the first and second performance parameters; and means 1316 for configuring the equalizer using the result of selecting.

The models, methods, and apparatus presented hereinabove serve as examples of various embodiments supporting different systems, channel conditions, and receiver designs. The application of parallel equalizers as described hereinabove may be implemented in any of a variety of receivers adapted for operation in a variety of communication systems, including but not limited to high data rate systems.

Those skilled in the art will appreciate that the various illustrative logical blocks, modules, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of estimating a transmitted signal from a received sample using an equalizer defined by a set of parameters, the method comprising:

determining a first set of values for the set of parameters;

training the equalizer to generate an updated first set of values;

estimating a first performance parameter of the equalizer, the first performance parameter associated with the updated first set of values;

setting a second set of values for the set of parameters, wherein the second set of values effectively changes the configuration of the equalizer;

training the equalizer to generate an updated second set of values;

estimating a second performance parameter of the equalizer, the second performance parameter associated with the updated second set of values;

comparing the first performance parameter to the second performance parameter;

selecting one of the first and second sets of values based on comparing the first and second performance parameters; and configuring the equalizer using the result of selecting.

2. The method of claim 1 wherein a known sequence of samples is used for training the equalizer.

3. The method of claim 1, wherein the first performance parameter is the Carrier-to-Interference (C/I) ratio of the equalizer.

4. The method of claim 1, further comprising:

receiving data samples; storing said data samples in a sample memory storage device;

retrieving at least a portion of the data samples; and processing the at least a portion of the data samples with the configured equalizer.

5. The method of claim 1, further comprising:

storing the selected one of the first and second sets of values in a parameter memory storage.

6. The method of claim 1, wherein the set of parameters includes filter coefficients for a first filter of the equalizer.

7. The method of claim 6, wherein the set of parameters further includes filter coefficients for a second filter of the equalizer.

8. The method of claim 1, wherein the set of parameters includes a DC offset of the received sample.

9. The method of claim 1, wherein the set of parameters includes a sector identifier.

10. The method of claim 1, wherein the set of parameters includes a phase of the received sample.

11. An apparatus for estimating a transmitted signal from a received sample using an equalizer defined by a set of parameters, the apparatus comprising:
   means for determining a first set of values for the set of parameters;
   means for training the equalizer to generate an updated first set of values;
   means for estimating a first performance parameter of the equalizer, the first performance parameter associated with the updated first set of values;
   means for setting a second set of values for the set of parameters, wherein the second set of values effectively changes the configuration of the equalizer;
   means for training the equalizer to generate an updated second set of values;
   means for estimating a second performance parameter of the equalizer, the second performance parameter associated with the updated second set of values;
   means for comparing the first performance parameter to the second performance parameter;
   means for selecting one of the first and second sets of values based on comparing the first and second performance parameters; and
   means for configuring the equalizer using the result of selecting.

12. A wireless apparatus, comprising:
   an equalizer configured to estimate a transmitted signal from a received sample, the equalizer being defined by a set of parameters, and further being configured to,
   determine a first set of values for the set of parameters,
   train to generate an updated first set of values,
   estimate a first performance parameter, the first performance parameter associated with the updated first set of values,
   set a second set of values for the set of parameters, wherein the second set of values effectively changes the configuration of the equalizer,
   train to generate an updated second set of values,
   estimate a second performance parameter, the second performance parameter associated with the updated second set of values,
   compare the first performance parameter to the second performance parameter,
   select one of the first and second sets of values based on comparing the first and second performance parameters, and
   configure itself using the selected one of the first and second sets of values.

13. A method comprising:
   configuring an equalizer with a first set of parameters;
   training the equalizer configured with the first set of parameters on a received pilot signal;
   determining a first performance measure of the received pilot signal associated with the equalizer configured with the first set of parameters;
   configuring the equalizer with a second set of parameters;
   training the equalizer configured with the second set of parameters on the received pilot signal;
   determining a second performance measure of the received pilot signal associated with the equalizer configured with the second set of parameters;
   comparing the first performance measure and the second performance measure;
   based on said comparing, selecting one of the first set of parameters and the second set of parameters; and
   configuring the equalizer with the selected set of parameters.

14. The method of claim 13, further comprising processing received data samples with the configured equalizer.

15. An apparatus comprising:
   a configurable equalizer; and
   a configuration selection unit to:
   configure the equalizer with a first set of parameters;
   train the equalizer configured with the first set of parameters on a received pilot signal;
   determine a first performance measure of the received pilot signal associated with the equalizer configured with the first set of parameters;
   configure the equalizer with a second set of parameters;
   train the equalizer configured with the second set of parameters on the received pilot signal;
   determine a second performance measure of the received pilot signal associated with the equalizer configured with the second set of parameters;
   compare the first performance measure and the second performance measure;
   based on said compare, select one of the first set of parameters and the second set of parameters; and
   configure the equalizer with the selected set of parameters.

* * * * *